(12) United States Patent
Lu

(10) Patent No.: US 6,709,127 B2
(45) Date of Patent: Mar. 23, 2004

(54) HANDHELD PERSONAL AID

(76) Inventor: Clive S. Lu, 282 Newbridge Rd., Hicksville, NY (US) 11801

(*) Notice: Subject to any disclaimer, the term of this patent is extended or adjusted under 35 U.S.C. 154(b) by 0 days.

(21) Appl. No.: 10/213,094

(22) Filed: Aug. 7, 2002

(65) Prior Publication Data

US 2003/0002277 A1 Jan. 2, 2003

Related U.S. Application Data

(63) Continuation-in-part of application No. 09/783,040, filed on Feb. 15, 2001, now Pat. No. 6,447,140.

(51) Int. Cl.[7] .................. F21W 111/10; G02C 11/00
(52) U.S. Cl. .................. 362/109; 362/154; 362/253; 235/375; 235/486; 351/158
(58) Field of Search ................ 235/375, 486, 235/487, 492; 351/158; 362/103, 105, 109, 154, 156, 253

(56) References Cited

U.S. PATENT DOCUMENTS

| | | | |
|---|---|---|---|
| 4,213,035 A | 7/1980 | Washizuka et al. .... 235/92 DN |
| 4,670,853 A | 6/1987 | Stepien ................ 364/70 S |
| 4,806,011 A | * 2/1989 | Bettinger ............... 351/158 |
| 4,843,223 A | 6/1989 | Shino ................... 235/487 |
| 5,015,830 A | 5/1991 | Masuzawa et al. ......... 235/441 |
| 5,276,317 A | 1/1994 | Ozouf et al. ............. 235/486 |
| 5,402,095 A | 3/1995 | Janniere ................ 235/441 |
| 5,490,039 A | 2/1996 | Helms .................. 361/683 |
| 5,560,476 A | 10/1996 | Lee ...................... 206/38 |
| 5,608,203 A | * 3/1997 | Finkelstein et al. ........ 235/487 |
| 5,670,769 A | 9/1997 | Pernet .................. 235/441 |
| 5,675,524 A | 10/1997 | Bernard ................ 364/705.05 |
| 5,763,862 A | * 6/1998 | Jachimowicz et al. ...... 235/486 |
| 5,806,670 A | 9/1998 | Harlan et al. ............ 206/232 |
| 5,811,770 A | 9/1998 | Bonnemoy .............. 235/380 |
| 6,026,873 A | 2/2000 | Van Geer ................ 150/147 |
| 6,040,829 A | 3/2000 | Croy et al. .............. 345/327 |
| 6,089,459 A | 7/2000 | Eisele et al. ............. 235/492 |
| 6,097,606 A | 8/2000 | Groves et al. ............ 361/747 |
| 6,108,640 A | 8/2000 | Slotznick ............... 705/26 |
| 6,259,769 B1 | 7/2001 | Page et al. .............. 379/58 |
| 6,390,372 B1 | * 5/2002 | Waters ................. 235/487 |

FOREIGN PATENT DOCUMENTS

| | | | |
|---|---|---|---|
| JP | 2000-113091 | 6/1999 | |
| WO | WO 91/12593 | 8/1991 | ........... 235/492 |
| WO | WO 01/67374 | 4/2000 | |

* cited by examiner

*Primary Examiner*—Alan Cariaso
(74) *Attorney, Agent, or Firm*—Welsh & Flaxman LLC

(57) ABSTRACT

A personal aid including a handheld housing sized to be readily carried by a user. The personal aid further includes eyeglasses coupled to the housing for selective retrieval by a user of the personal aid, a smart card holder formed with the housing and an electronic assistant integrated with the housing. The electronic assistant is linked to the smart card holder in which a smart card is positioned to provide functionality to the electronic assistant.

15 Claims, 2 Drawing Sheets

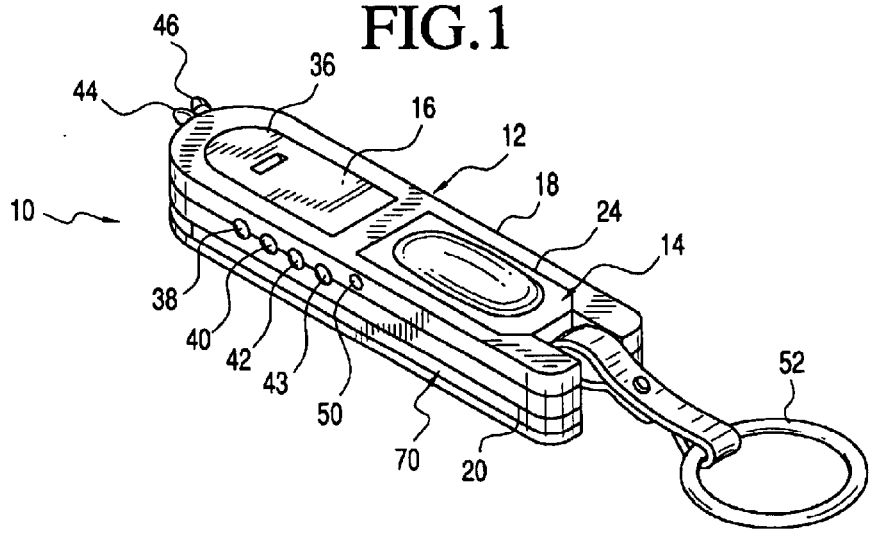
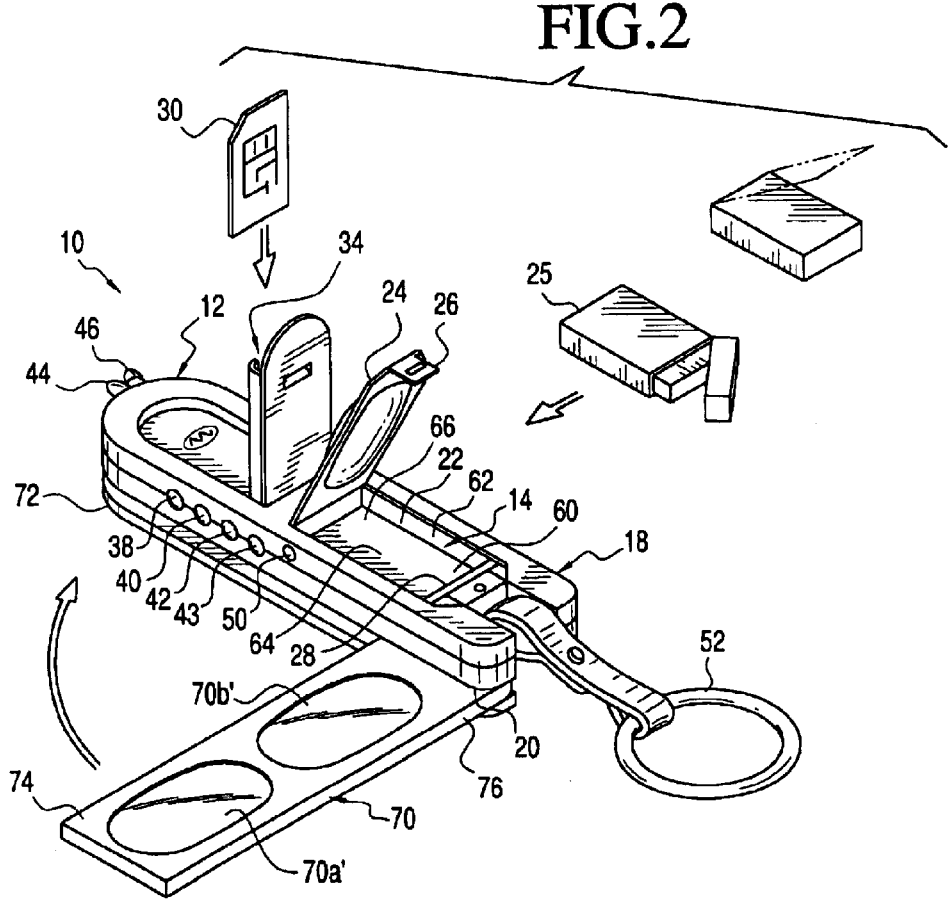

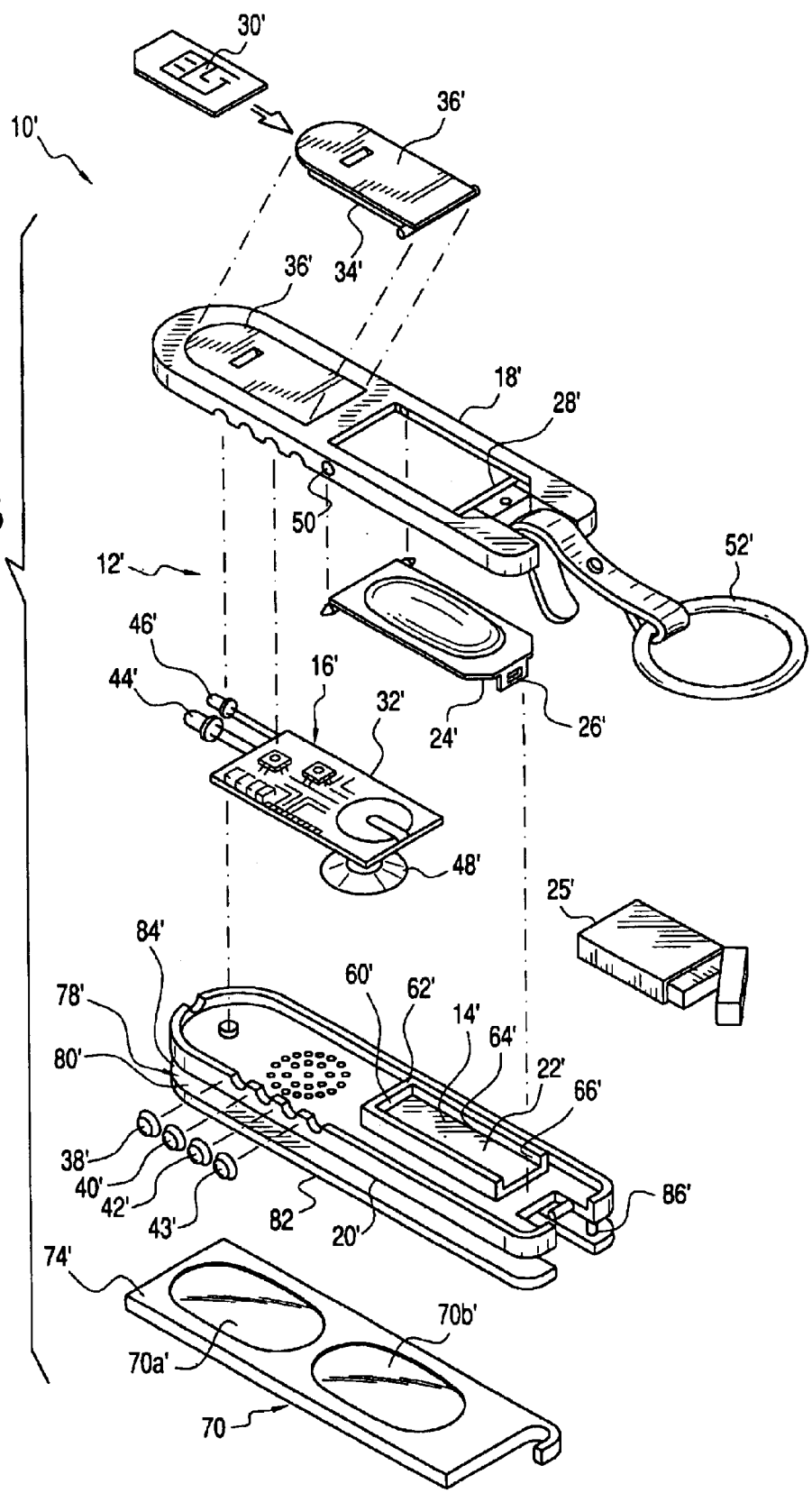

HANDHELD PERSONAL AID

RELATED APPLICATION INFORMATION

This application is a continuation-in-part of U.S. patent application Ser. No. 09/783,040, filed Feb. 15, 2001, now U.S. Pat. No. 6,447,140 entitled "HANDHELD PERSONAL AID", which is currently pending.

BACKGROUND OF THE INVENTION

1. Field of the Invention

The invention relates to a handheld personal aid. More particularly, the invention relates to a personal aid combining a carrying case with a personal digital assistant.

2. Description of the Prior Art

While the advent of personal digital assistants, and other portable, handheld electronic devices have simplified the manner in which we transmit, carry and transfer information, these devices have added to the number of objects which we carry with us as we go about our daily routine. For example, in addition to the personal digital assistant storing a vast amount of information, people must still carry medicine, cosmetics, credit cards, various "smart cards" etc.

Unfortunately, the many items we carry with us on a daily basis necessitate the use of a carrying case of some sort to keep all of the items readily accessible. As a result, the electronic devices originally developed to simplify our lives have in fact only added to the many objects we already must keep with us on a daily basis.

With this in mind, a need exists for a convenient way in which to carry the many items we use on a daily basis. The present invention provides such a device.

SUMMARY OF THE INVENTION

It is, therefore, an object of the present invention to provide a personal aid including a handheld housing sized to be readily carried by a user. The personal aid further includes eyeglasses coupled to the housing for selective retrieval by a user of the personal aid, a smart card holder formed with the housing and an electronic assistant integrated with the housing. The electronic assistant is linked to the smart card holder in which a smart card is positioned to provide functionality to the electronic assistant.

It is also an object of the present invention to provide a personal aid wherein the eyeglasses are permanently secured to the housing and are rotated between a use position and a storage position.

It is further an object of the present invention to provide a personal aid wherein the eyeglasses are selectively secured to the housing.

It is another object of the present invention to provide a personal aid wherein the housing includes a slot shaped and dimensioned for receiving and storing the eyeglasses.

It is also an object of the present invention to provide a personal aid wherein the housing includes a storage compartment, the storage compartment comprising an enclosure shaped and dimensioned for the selective placement of an article therein, and a closure positioned adjacent the enclosure for selectively covering the enclosure so as to maintain an article therein.

It is still another object of the present invention to provide a personal aid wherein the enclosure comprises a rigid recess formed in the housing, the recess including a bottom wall, upstanding sidewalls and an open top.

It is also an object of the present invention to provide a personal aid wherein the electronic assistant includes means for providing a light.

It is a further object of the present invention to provide a personal aid wherein the electronic assistant includes an infrared transmitter and receiver.

It is another object of the present invention to provide a personal aid including a speaker positioned within the housing and coupled to the electronic assistant, wherein the electronic assistant include means for driving speaker.

It is still a further object of the present invention to provide a personal aid including a container for selectively positioning within the storage compartment.

It is also another object of the present invention to provide a personal aid wherein the smart card is selectively positioned within the smart card holder.

It is yet another object of the present invention to provide a personal aid wherein the smart card holder rotates between an secured, closed position and an unsecured, receiving position.

It is also an object of the present invention to provide a personal aid wherein the smart card holder includes a cover.

It is a further object of the present invention to provide a personal aid wherein the electronic assistant includes a plurality of switches controlling operation thereof.

It is another object of the present invention to provide a personal aid wherein the electronic assistant includes four switches.

Other objects and advantages of the present invention will become apparent from the following detailed description when viewed in conjunction with the accompanying drawings, which set forth certain embodiments of the invention.

BRIEF DESCRIPTION OF THE DRAWINGS

FIG. 1 is a perspective view of a first embodiment of the personal aid with the smart card holder in a closed position and the eyeglasses in a storage position.

FIG. 2 is a perspective view of a first embodiment of the personal aid with the smart card holder and compartment in opened positions, as well as the eyeglasses in an retrieved position.

FIG. 3 is an exploded view of a second embodiment of the present personal aid.

DESCRIPTION OF THE PREFERRED EMBODIMENTS

The detailed embodiments of the present invention are disclosed herein. It should be understood, however, that the disclosed embodiment is merely exemplary of the invention, which may be embodied in various forms. Therefore, details disclosed herein are not to be interpreted as limited, but merely as the basis for the claims and as a basis for teaching one skilled in the art how to make and/or use the invention.

It should be understood that first and second embodiments of the present invention are disclosed herein. As many of the elements of the different embodiments are identical, "'" is used to designate elements of the second embodiment while the reference numerals themselves remain the same.

With reference to FIGS. 1, 2 and 3, a handheld personal aid 10, 10' in accordance with the present invention is disclosed. The personal aid 10, 10' generally includes a handheld housing 12, 12' sized to be readily carried by a user. The housing 12, 12' includes a storage compartment 14, 14'. The handheld personal aid 10, 10' further includes an electronic assistant 16, 16' integrated with the housing 12, 12'. The housing 12, 12' may also be provided with accessories, such as, a key chain holder 52, 52'.

The housing 12, 12' is preferably formed from upper and lower halves 18, 18', 20, 20' bound together using conventional manufacturing techniques. With this in mind, the upper and lower halves 18, 18', 20, 20' of the housing 12, 12' are manufactured from high impact plastic, although other materials may be used without departing from the spirit of the present invention.

With reference to the storage compartment 14, 14', the compartment 14, 14' includes an enclosure 22, 22' shaped and dimensioned for the placement of various articles therein. For example, the enclosure 22, 22' is shaped to receive articles such as, but not limited to, lipstick, medicine containers, eyeshadow, keys etc. which may be stored in a container 25, 25'. The enclosure 22, 22' is formed by creating a recess 60, 60' in the lower half 20, 20' of the housing. The recess 60, 60' includes upstanding sidewalls 62, 62', a bottom wall 64, 64' and an open top 66, 66'. The storage compartment 14, 14' is further provided with a closure 24, 24' shaped and dimensioned to securely cover the enclosure 22, 22' for the safe storage of articles therein. The closure 24, 24' is hinged to the upper half 18, 18' of the housing 12, 12' for selective closure of the enclosure 22, 22'. With this in mind, the closure 24, 24' is provided with a latch 26, 26' which engages a mating latch 28, 28' on the upper half 18, 18' of the closure 24, 24' for ensuring the secure closure of the storage compartment 14, 14'.

The electronic assistant 16, 16' works in conjunction with a selectively replaceable smart card 30, 30' to bring electronic functionality to the present handheld personal aid 10, 10'. Specifically, the electronic assistant 16, 16' is composed of a printed circuit board 32' (not shown in FIGS. 1 and 2) stored within the housing 12, 12' between the upper and lower halves 18, 18', 20, 20' thereof. The smart card 30, 30' is housed within a smart card holder 34, 34' built into the upper half 18, 18' of the housing 12. The smart card holder 34, 34' rotates between an unsecured, receiving position and an secured, closed position. The positioning of the smart card holder 34, 34' locks and unlocks the smart card 30, 30' in contacted position. The system may then be actuated by activating one of the first, second, third or fourth switches 38, 38', 40, 40', 42, 42', 43, 43'. In order to ensure that the smart card 30, 30' is not damaged as an individual uses the handheld personal aid 10, 10' the smart card holder 34, 34' is provided with a cover 36, 36' that is selectively closed to securely seal a smart card 30, 30' within the smart card holder 34, 34'.

The smart card holder 34, 34', and ultimately the smart card 30, 30', are electrically coupled to the printed circuit board 32'. In this way, the smart card 30, 30' and the printed circuit board 32' work together to provide desired functionality to the handheld personal aid 10, 10'. Specifically, and as those skilled in the art will certainly appreciate, a smart card 30, 30' is a credit card sized plastic card embedded with an integrated circuit chip making it "smart". Smart cards can store several hundred times more data than a conventional card with a magnetic stripe. The information and/or applications stored in the integrated circuit chip of the smart card are transferred through an electronic module that interconnects with a terminal or card reader. In accordance with the present invention, the smart card interconnects with the printed circuit board to reveal the functionality thereof.

In accordance with alternate embodiments, a contactless smart card maybe utilized. A contactless smart card has an antenna coil which communicates with a receiving antenna to transfer information between the integrated circuit chip of the smart card and the unit processing the information. In addition, and depending upon the type of embedded chip, smart cards can be either memory cards or processor cards.

Memory cards hold information thousands of times greater than a magnetic stripe card. Although these cards hold vast quantities of information, their functions are limited to basic applications such as phone cards. In contrast, processor cards contain a full-fledge microprocessor on board and can function as a processor device offering multiple functions, such as, encryption, advance security mechanisms, local data processing, conflict calculations and other interactive processes. Most stored-value cards integrated with identification, security and information purposes are processor cards. Only processor cards are truly smart enough to offer the flexibility and multi-functionality desired in the networked economy.

In addition to those cards commonly referred to as "smart cards", PC cards may also be used in accordance with the present invention and are for the purposes of the present specification considered to be "smart cards". PC cards (also known as PCMCIA cards) have the same characteristics as smart cards but are used as peripheral devices such as modems or game cartridges. PC cards are generally extension devices for other processing units and function without personalization.

Regardless of the smart card 30, 30' used in conjunction with the present handheld personal aid 10, 10', the smart card 30, 30' integrates with the printed circuit board 32' to bring functionality to the present invention. For example, the smart card 30, 30' may permit the handheld personal aid 10, 10' to function as an infrared remote by inserting an appropriate smart card 30, 30' in the smart card holder 34, 34' and activating one of the first, second, third or fourth switches 38, 38, 40, 40', 42, 42', 43, 43' to transmit an infrared signal via an emitter 44, 44' positioned at the forward end of the housing 12, 12'.

Similarly, various smart cards 30, 30' maybe employed offering functionality to the handheld personal aid 10, 10' as an SOS flash signal operated by actuating one of the first, second, third or fourth switches 38, 38, 40, 40', 42, 42', 43, 43' to light a LED 46, 46' located at the forward portion of the housing 12, 12'. In addition, smart cards 30, 30' maybe employed which offer the ability to provide emergency transmission to a proper party. This is achieved by activating one of the first, second, third or fourth switches 38, 38, 40, 40', 42, 42', 43, 43' to begin transmission via cellular technology, RF technology or IR technology.

In addition, the smart card 30, 30' may provide audio functions to the handheld personal aid 10, 10'. The audio functions are achieved by the integration of the smart card 30, 30' and the printed circuit board 32' controlled by the first, second, third and/or fourth switches 38, 38, 40, 40', 42, 42', 43, 43', and output via a speaker 48' (not shown in FIGS. 1 and 2) or external speaker output 50, 50' linked to the printed circuit board 32.

Added functionality is achieved through the inclusion of eyeglasses 70, 70' with the present handheld personal aid 10, 10'. The eyeglasses 70, 70' may be simple reading glasses or may be prescription glasses specifically suited for the needs of an individual. The eyeglasses 70, 70' include a frame 74, 74' supporting first and second lenses 70a, 70b, 70a', 70b'. The first and second lenses 70a, 70b, 70a', 70b' are positioning in substantially the same plane such that when the eyeglasses are retrieved to a use position a user may look through the eyeglasses for viewing objects on an opposite side of the eyeglasses. Various embodiments for the inclusion of the eyeglasses in accordance with the present invention are disclosed in FIGS. 2 and 3.

In accordance with a first embodiment of the present invention as shown in FIG. 2, the eyeglasses 70 are secured to the underside 72 of the housing's lower half 20. With this in mind, the frame 74 of the eyeglasses 70 is shaped and dimensioned to conform with the profile of the housing 12 itself and align with the profile of the housing 12 when in its storage position as shown in FIG. 1. The eyeglasses 70 are permanently secured to the underside 72 of the housing's lower half 20 via a pivot pin (not shown) which is secured to a pivot hole (not shown) formed in the forward end 76 of the eyeglasses 70. As such, when an individual wishes to use the eyeglasses 70, he or she may simply rotate the eyeglasses 70 from a storage position as shown in FIG. 1 to a use position as shown in FIG. 2.

As those skilled in the art will certainly appreciate, individuals may wish to remove the eyeglasses 70' from the housing 12'. Removal of the eyeglasses 70' from the housing 12' provides individuals with additional freedom in the use of the eyeglasses 70' and/or allows an individual to replace one pair of eyeglasses with a different pair of eyeglasses.

In accordance with the embodiment disclosed in FIG. 3, the eyeglasses 70' are selectively stored within a slot 78'. The slot 78' is preferably formed along the underside 72' of the housing's lower half 20'. The slot 78' is shaped and dimensioned for receiving and storing eyeglasses 70'. As such, the slot 78' is provided with side walls 80', a bottom wall 82', a closed first end 84' and an open entry end 86'. The eyeglasses 70', therefore, maybe easily slid within the slot 78' when one desires to store them and retrieved from the slot 78' when the eyeglasses 70' are needed.

While the preferred embodiments have been shown and described, it will be understood that there is no intent to limit the invention by such disclosure, but rather, is intended to cover all modifications and alternate constructions falling within the spirit and scope of the invention as defined in the appended claims.

What is claimed is:

1. A personal aid, comprising:
   a handheld housing sized to be readily carried by a user;
   eyeglasses coupled to the housing for selective retrieval by a user of the personal aid, wherein the eyeglasses include first and second lenses positioning in substantially the same plane such that when the eyeglasses are retrieved to a use position a user may look through the eyeglasses for viewing objects on an opposite side of the eyeglasses;
   a smart card holder formed with the housing; and
   an electronic assistant integrated with the housing, the electronic assistant being linked to the smart card holder in which a smart card is positioned to provide functionality to the electronic assistant.

2. The personal aid according to claim 1, wherein the eyeglasses are permanently secured to the housing and are rotated relative to the handheld housing between a use position and a storage position.

3. The personal aid according to claim 1, wherein the eyeglasses are selectively secured to the housing.

4. The personal aid according to claim 3, wherein the housing includes a slot shaped and dimensioned for receiving and storing the eyeglasses.

5. The personal aid according to claim 1, wherein the housing further includes a storage compartment, the storage compartment comprising an enclosure shaped and dimensioned for the selective placement of an article therein, and a closure positioned adjacent the enclosure for selectively covering the enclosure so as to maintain an article therein.

6. The personal aid according to claim 5, wherein the enclosure comprises a rigid recess formed in the housing, the recess including a bottom wall, upstanding sidewalls and an open top.

7. The personal aid according to claim 1, wherein the electronic assistant includes means for providing a light.

8. The personal aid according to claim 1, further including a speaker positioned within the housing and coupled to the electronic assistant, wherein the electronic assistant include means for driving speaker.

9. The personal aid according to claim 1, further including a storage compartment and a container for selectively positioning within the storage compartment.

10. The personal aid according to claim 1, wherein the smart card is selectively positioned within the smart card holder.

11. The personal aid according to claim 10, wherein the smart card holder rotates relative to the handheld housing between a secured, closed position and an unsecured, receiving position.

12. The personal aid according to claim 11, wherein the smart card holder includes a cover.

13. The personal aid according to claim 1, wherein the electronic assistant includes a plurality of switches controlling operation thereof.

14. The personal aid according to claim 13, wherein the electronic assistant includes four switches.

15. A personal aid, comprising:
   a handheld housing sized to be readily carried by a user;
   eyeglasses coupled to the housing for selective retrieval by a user of the personal aid;
   a smart card holder formed with the housing; and
   an electronic assistant integrated with the housing, the electronic assistant being linked to the smart card holder in which a smart card is positioned to provide functionality to the electronic assistant;
   wherein the housing further includes a storage compartment comprising an enclosure shaped and dimensioned for the selective placement of an article therein and a closure positioned adjacent the enclosure for selectively covering the enclosure so as to maintain an article therein, the enclosure comprises a rigid recess formed in the housing, the recess including a bottom wall, upstanding sidewalls and an open top.

* * * * *